(12) United States Patent
Shimizu

(10) Patent No.: US 9,583,003 B2
(45) Date of Patent: Feb. 28, 2017

(54) VEHICLE DANGER NOTIFICATION CONTROL APPARATUS

(71) Applicant: Hitachi Automotive Systems, Ltd., Hitachinaka-shi, Ibaraki (JP)

(72) Inventor: Ryosuke Shimizu, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/893,656

(22) PCT Filed: Mar. 14, 2014

(86) PCT No.: PCT/JP2014/056820
§ 371 (c)(1),
(2) Date: Nov. 24, 2015

(87) PCT Pub. No.: WO2014/192369
PCT Pub. Date: Dec. 4, 2014

(65) Prior Publication Data
US 2016/0121791 A1  May 5, 2016

(30) Foreign Application Priority Data
May 31, 2013 (JP) ................................. 2013-115589

(51) Int. Cl.
*B60Q 1/00* (2006.01)
*G08G 1/16* (2006.01)
*B60Q 1/52* (2006.01)

(52) U.S. Cl.
CPC ............. *G08G 1/166* (2013.01); *B60Q 1/525* (2013.01)

(58) Field of Classification Search
CPC .................. G08G 1/166; B60Q 1/525
See application file for complete search history.

(56) References Cited

U.S. PATENT DOCUMENTS 8,365,918 B1\* 2/2013 Andino .................... B60Q 7/00
206/223
2009/0265107 A1\* 10/2009 Matsuno ................ G08G 1/166
701/301
(Continued)

FOREIGN PATENT DOCUMENTS

JP     2004-46426 A     2/2004
JP     2006-171831 A    6/2006
(Continued)

OTHER PUBLICATIONS

International Search Report (PCT/ISA/210) issued in PCT Application No. PCT/JP2014/056820 dated Jul. 8, 2014 with English translation (five pages).

*Primary Examiner* — Erin File
(74) *Attorney, Agent, or Firm* — Crowell & Moring LLP

(57) ABSTRACT

A pedestrian and a driver of a running vehicle that are in the vicinity of a stopped vehicle are notified of a danger of collision with a vehicle, without requiring the pedestrian to carry a communication terminal. A vehicle danger notification control apparatus includes an outside recognition arrangement for recognizing a running vehicle and/or a pedestrian as a moving object(s), a danger determination arrangement for determining whether there is a danger of collision(s) between the running vehicle and the pedestrian and/or between the running vehicles, and a danger notification arrangement for notifying, in a case in which the danger determination means determines that there is a collision danger, a driver of the running vehicle and/or the pedestrian of the collision danger.

11 Claims, 6 Drawing Sheets

(56) References Cited

U.S. PATENT DOCUMENTS

| | | | | |
|---|---|---|---|---|
| 2010/0201509 A1* | 8/2010 | Hara | ...................... | G08G 1/166 340/435 |
| 2013/0321143 A1* | 12/2013 | Boyer | ...................... | B60Q 1/44 340/463 |
| 2014/0052293 A1* | 2/2014 | Bruemmer | ........... | G05D 1/0088 700/248 |
| 2015/0092988 A1* | 4/2015 | Mitoma | ................. | G08G 1/166 382/104 |

FOREIGN PATENT DOCUMENTS

| | | |
|---|---|---|
| JP | 2008-7079 A | 1/2008 |
| JP | 2009-271766 A | 11/2009 |

\* cited by examiner

VEHICLE DANGER NOTIFICATION CONTROL APPARATUS

TECHNICAL FIELD

The present invention relates to a vehicle danger notification control apparatus, and relates to an apparatus for notifying, for example, a pedestrian and a driver of a vehicle that are in the vicinity of a stopped own vehicle, of a danger of collision with a vehicle.

BACKGROUND ART

It is difficult to detect a pedestrian behind a stopped vehicle, which is in a blind area as seen from a driver of a running vehicle, using a radar or a camera for recognizing a front side of the running vehicle. There is proposed a vehicle warning system that can detect a target object such as a pedestrian that cannot be visually recognized by a driver as described above, and make the driver recognize a target object which may affect the running of the own vehicle (for example, refer to PTL 1 described below).

The vehicle warning system of PTL 1 requires a target object such as a pedestrian to carry a communication terminal. The communication terminal reports a position of the communication terminal itself to a vehicle warning apparatus mounted on a vehicle. The vehicle warning apparatus thereby identifies position information of the target object such as a pedestrian that carries the communication terminal. Then, based on position information of the own vehicle that has been detected by an own vehicle position detection means, and the size and position information of an object, such as a stopped vehicle positioned on the front side of the own vehicle in a travelling direction, which have been detected by an object detection means, the vehicle warning apparatus calculates a positional relationship between three, i.e., between the own vehicle, the object such as a stopped vehicle, and the target object such as a pedestrian. Then, if it is determined that the position of the target object such as a pedestrian that carries the communication terminal exists in a blind area behind the object such as a stopped vehicle positioned in the travelling direction of the own vehicle, the target object carrying the communication terminal is determined to be a warning target object. As a result, only the target object that cannot be visually recognized by the driver of the own vehicle is recognized as a warning target object, and a warning is issued to the driver.

CITATION LIST

Patent Literature

PTL 1: JP 2004-46426 A

SUMMARY OF INVENTION

Technical Problem

The conventional technique, however, is premised on that a target object such as a pedestrian carries a communication terminal that can report the position of the target object itself to a vehicle warning apparatus mounted on a vehicle. Thus, if a pedestrian does not have the communication terminal, the pedestrian behind a stopped vehicle cannot be detected. Accordingly, the pedestrian and a driver of a running vehicle cannot be notified of a danger of collision. In addition, even though a pedestrian carries the communication terminal, if the communication terminal acquires its position information by, for example, the global positioning system (GPS), unnecessary warnings may be issued to a pedestrian, or necessary warnings may fail to be issued thereto, depending on the accuracy of the position information.

The present invention has been contrived in view of the above issue, and an object of the present invention is to provide a vehicle danger notification control apparatus that can notify a pedestrian and/or a driver of a running vehicle that are/is in the vicinity of a stopped own vehicle that generates a blind area, of a danger of collision with a running vehicle, without requiring the pedestrian to carry a communication terminal.

Solution to Problem

To achieve the object, a vehicle danger notification control apparatus according to the present invention is a vehicle danger notification control apparatus for notifying a driver of a running vehicle and/or a pedestrian that are/is in the vicinity of a stopped own vehicle, of a danger(s) of collision(s) between the running vehicle and the pedestrian and/or between the running vehicles, and includes an outside recognition means for recognizing the running vehicle and/or the pedestrian as a moving object(s), a danger determination means for determining whether there is a danger(s) of collision(s) between the running vehicle and the pedestrian and/or between the running vehicles, and a danger notification means for notifying, in a case in which the danger determination means determines that there is the danger(s) of collision(s), a driver of the running vehicle and/or the pedestrian of the danger(s) of collision(s).

Herein, "a driver and/or a pedestrian" can be rephrased as "at least one of a driver and a pedestrian." Similarly, "a running vehicle and/or a pedestrian" and "collision(s) between the running vehicle and the pedestrian and/or between the running vehicles" can be rephrased as "at least one of a running vehicle and a pedestrian" and "at least one of collision between the running vehicle and the pedestrian, and collision between the running vehicles," respectively.

Advantageous Effects of Invention

According to the vehicle danger notification control apparatus of the present invention, a stopped vehicle that generates a blind area for a running vehicle and/or a driver can determine by itself a danger(s) of collision(s) between a running vehicle and a pedestrian and/or between running vehicles that are in the vicinity of the stopped vehicle, and notify drivers of the running vehicles and/or the pedestrian of the danger(s) of collision(s). Thus, the vehicle danger notification control apparatus of the present invention can notify a pedestrian or drivers of running vehicles that are in the vicinity of a stopped vehicle, of a danger of collision with a running vehicle, without requiring the pedestrian to carry a communication terminal.

DESCRIPTION OF EMBODIMENTS

First Embodiment

Figure 1:
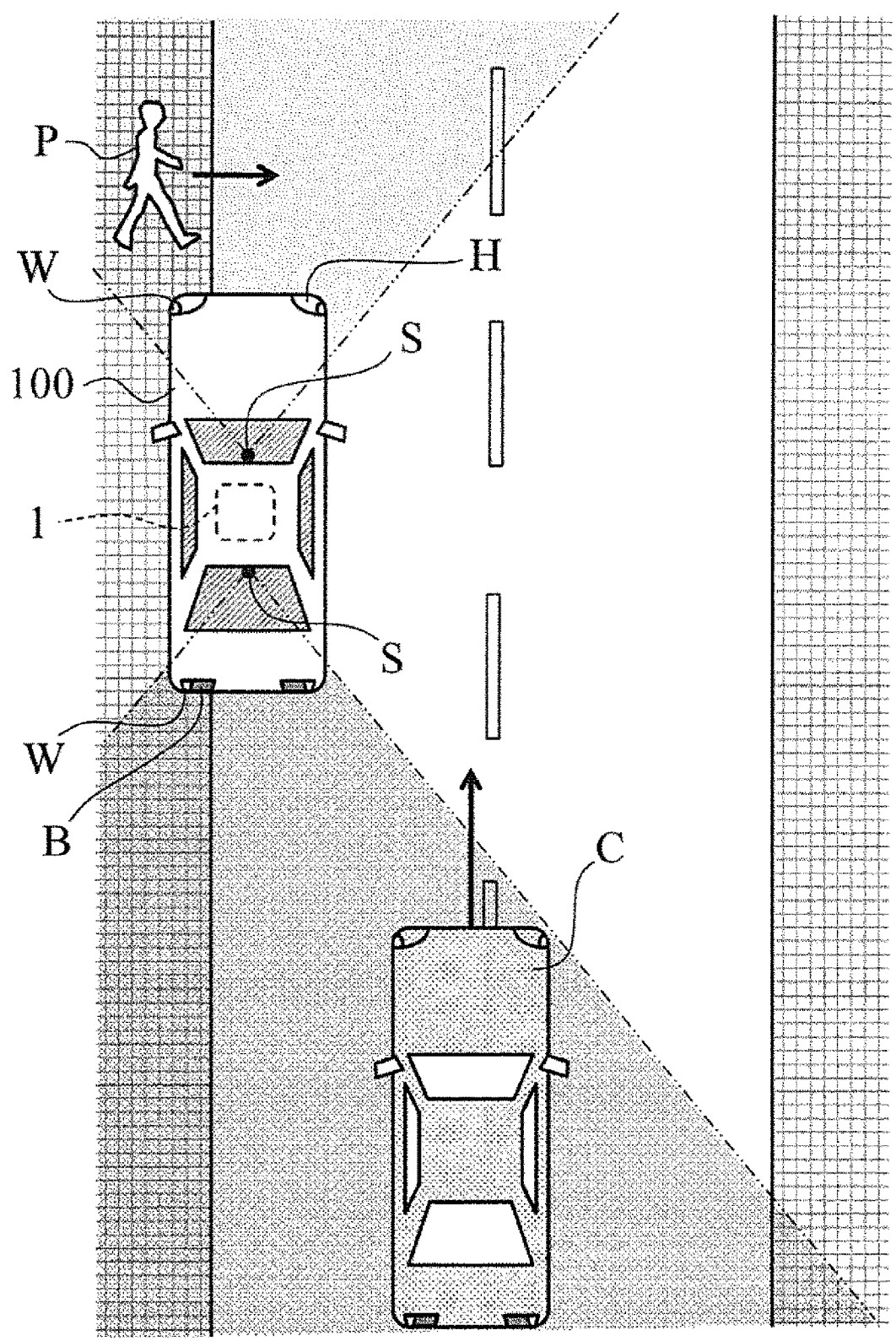
FIG. 1 is a schematic view of a first example illustrating a state in which a vehicle equipped with a danger notification control apparatus according to a first embodiment of the present invention is parked.

A vehicle danger notification control apparatus according to an embodiment of the present invention will be described below with reference to the drawings. FIG. 1 is a schematic view of a first example illustrating a state of a vehicle equipped with a danger notification control apparatus according to the present embodiment and the vicinity of the vehicle.

An own vehicle 100 is a vehicle in a stopped state, and is equipped with a danger notification control apparatus 1. FIG. 1 illustrates a state in which a pedestrian P is walking and a vehicle C is running in the vicinity of the stopped own vehicle 100. In addition, the own vehicle 100 includes, on the front side and the rear side thereof, respective stereo cameras S and S for capturing an image of the front side and the rear side. In FIG. 1, areas that can be image-captured by the respective stereo cameras S are represented by shaded areas defined by dashed-two dotted lines. In FIG. 1, angles of the areas that can be image-captured by the respective stereo cameras S are displayed to be narrower than actual angles. In addition, the own vehicle 100 includes a headlight H, a winker W, a brake lamp B, and the like. The danger notification control apparatus 1 mounted on the own vehicle 100 is a vehicle danger notification control apparatus for notifying the pedestrian P, and/or a driver of the running vehicle C or another running vehicle, of a danger of collision.

Figure 2:
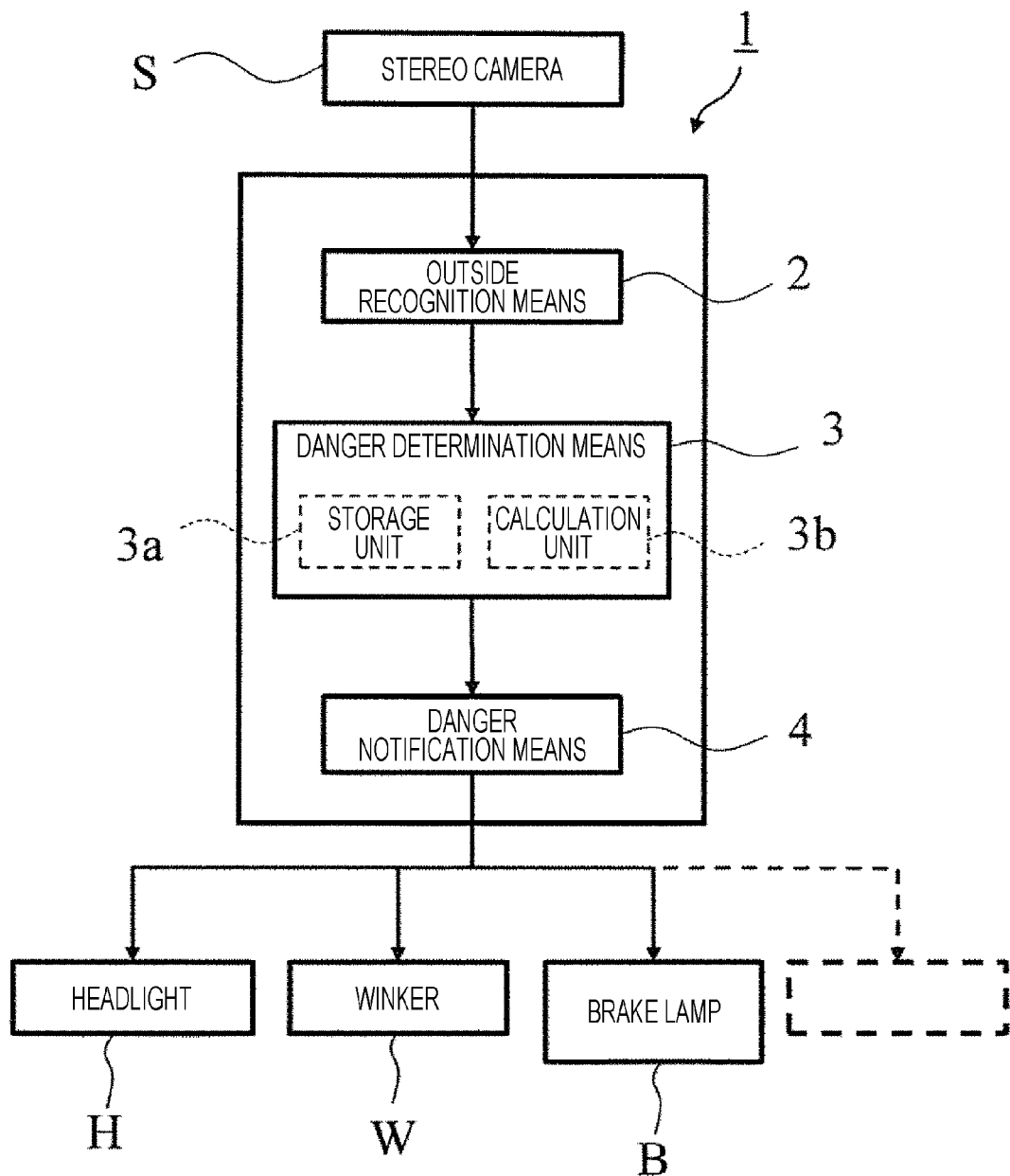
FIG. 2 is a control block diagram of the danger notification control apparatus according to the first embodiment of the present invention.

FIG. 2 is a control block diagram of the danger notification control apparatus 1 according to the present embodiment. The danger notification control apparatus 1 includes an outside recognition means 2, a danger determination means 3, and a danger notification means 4.

The outside recognition means 2 detects, based on images captured by the stereo cameras S, a detected object such as the vehicle C or the pedestrian P that is in the vicinity of the own vehicle 100, and the size of the detected object. The outside recognition means 2 identifies, based on images of the detected object and by, for example, pattern matching, that the detected object is the vehicle C, the pedestrian P, or an obstacle. The outside recognition means 2 sequentially calculates, based on the images of the detected object, a distance between the own vehicle 100 and the detected object, and a relative position of the detected object with respect to the own vehicle 100. When the position of the detected object is moving as time advances, the outside recognition means 2 recognizes the detected object as a moving object.

The danger determination means 3 includes a storage unit 3a and a calculation unit 3b. The storage unit 3a includes, for example, a memory for storing a relative position of a moving object with respect to the own vehicle 100 that is sequentially calculated by the outside recognition means 2.

The calculation unit 3b includes, for example, a central processing unit (CPU) for calculating a moving direction and a moving speed of a moving object based on a temporal change in the relative position. The danger determination means 3 determines whether the own vehicle 100 is in a stopped state or in a running state, based on, for example, an own vehicle speed obtained from a speed measuring means for measuring an own vehicle speed. Herein, the "stopped state" includes not only a parked state, but also temporary stop and slow running during a right or left turn, when waiting at a traffic light, or on a clogged road, for example.

When the danger determination means 3 determines that the own vehicle 100 is in a stopped state, and the outside recognition means 2 determines that at least one of moving objects is a vehicle, the danger determination means 3 calculates, by the calculation unit 3b, a moving direction and a moving speed of a moving object in the vicinity of the own vehicle 100, and stores calculation results of the calculation unit 3b into the storage unit 3a. In addition, the danger determination means 3 calculates, by the calculation unit 3b, a relative position of the moving object that is obtainable after an arbitrary time elapses, based on the relative position, the moving direction, and the moving speed of the moving object that are stored in the storage unit 3a. Through the above processing, when at least one of moving objects detected by the outside recognition means 2 is a vehicle, the danger determination means 3 determines whether there is a danger of collision between a pedestrian and a vehicle or between vehicles.

When the danger determination means 3 determines that there is a danger of collision, the danger notification means 4 notifies a moving object, i.e., a pedestrian or a driver of a vehicle, of a danger of collision. The danger notification means 4 of the present embodiment notifies a pedestrian or a driver of a vehicle that is in the vicinity of the own vehicle 100, of a danger of collision using a general-purpose device mounted on the own vehicle 100 for a purpose different from a danger notification purpose. More specifically, the danger notification means 4 flickers, for example, the headlight H, the winker W, the brake lamp B, a small light (not illustrated), a fog lamp (not illustrated), a backup light (not illustrated), or the like. Alternatively, the danger notification means 4 honks a horn. In this manner, the danger notification means 4 notifies a pedestrian or a driver of a vehicle of a danger of collision using a general-purpose device mounted on the own vehicle 100 in advance. For example, in the case of a commercial vehicle or the like, if the own vehicle 100 has an external speaker for notifying a pedestrian or a vehicle that is in the vicinity, of a right or left turn, or backward movement, the danger notification means 4 can also issue danger notification using the external speaker. In addition, if the own vehicle 100 has an antitheft alarm, the danger notification means 4 can also issue danger notification using the antitheft alarm.

Figure 3:
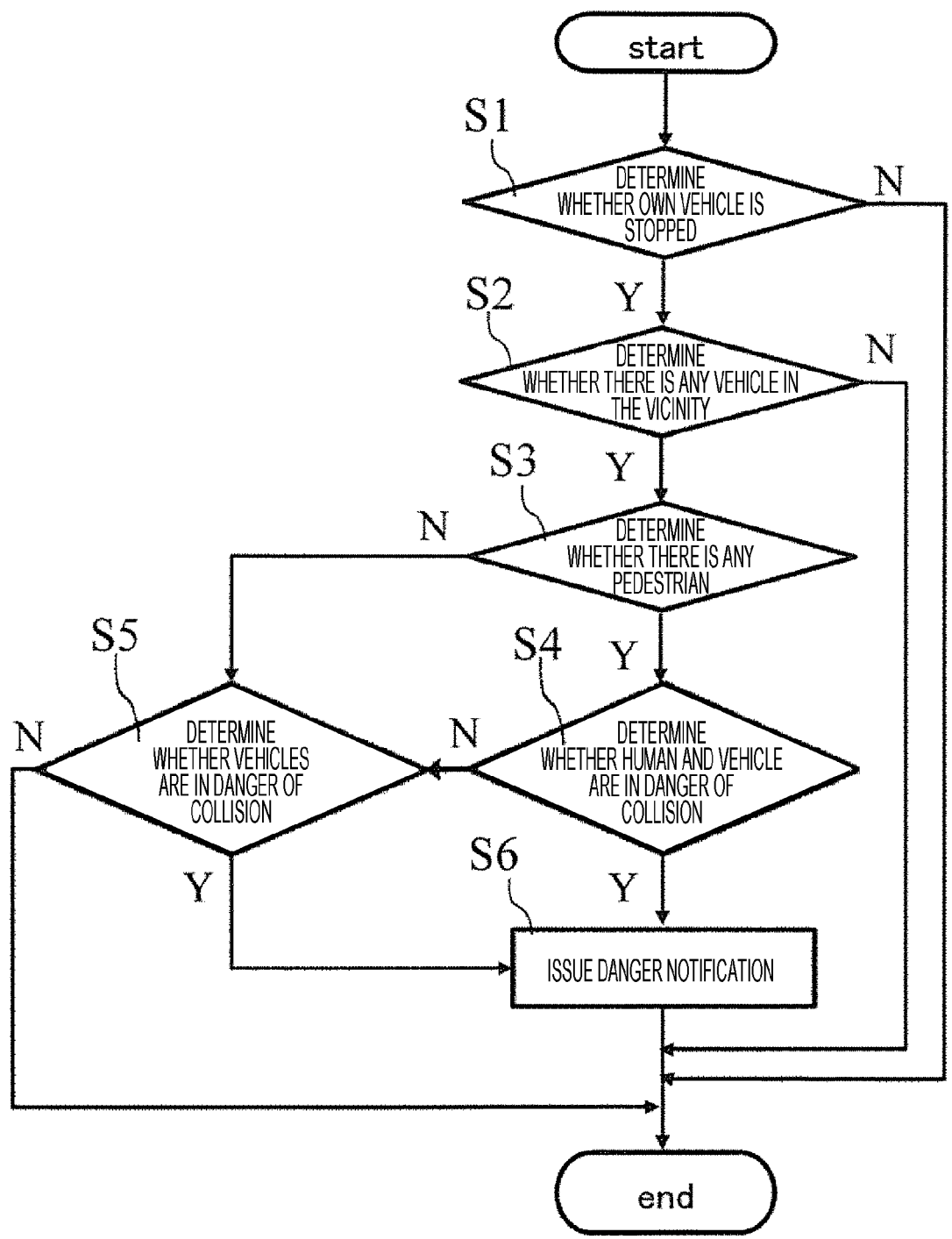
FIG. 3 is a flowchart illustrating an operation of the danger notification control apparatus illustrated in FIG. 2.

Next, an operation of the danger notification control apparatus 1 illustrated in FIGS. 1 and 2 will be described. FIG. 3 is a flowchart illustrating an operation of the danger notification control apparatus 1.

As illustrated in FIG. 1, if the own vehicle 100 is parked by the side of a road, in a determination process S1 illustrated in FIG. 3, the danger determination means 3 determines that the own vehicle 100 is in a stopped state (Y), and the processing proceeds to a determination process S2. In contrast, if the own vehicle 100 is in a running state, the danger determination means 3 determines in the determination process S1 that the own vehicle 100 is not in a stopped state (N), and the processing of the danger notification control apparatus 1 ends.

In the determination process S2, the danger determination means 3 determines whether there is any vehicle in the vicinity. More specifically, the outside recognition means 2 captures images of the front side and the rear side of the stopped own vehicle 100 using the two respective stereo cameras S for checking the front side and the rear side that are mounted on the own vehicle 100 as illustrated in FIG. 1. As described above, based on the images of detected objects detected by the stereo cameras S, the outside recognition means 2 identifies that the detected objects are the pedestrian P and the running vehicle C, and recognizes the moving pedestrian P and the running vehicle C as moving objects. As a result, the danger determination means 3 determines in the determination process S2 that at least one of the moving objects is the vehicle C, i.e., that there is the vehicle C in the vicinity of the own vehicle 100 (Y), and the processing proceeds to a determination process S3.

In contrast, if the vehicle C is not in the vicinity of the own vehicle 100, and the outside recognition means 2 does not identify the vehicle C from the detected objects, the danger determination means 3 determines in the determination process S2 that there is no vehicle in the vicinity of the own vehicle 100 (N), and the processing of the danger notification control apparatus 1 ends.

In the determination process S3, the danger determination means 3 determines whether there is a pedestrian in the vicinity of the own vehicle 100. More specifically, as described above, if the outside recognition means 2 identifies the moving pedestrian P from the detected objects, the danger determination means 3 determines in the determination process S3 that there is the pedestrian P in the vicinity of the own vehicle 100 (Y), and the processing proceeds to a determination process S4.

In contrast, if the pedestrian P is not in the vicinity of the own vehicle 100, and the outside recognition means 2 does not identify the pedestrian P from the detected objects, the danger determination means 3 determines in the determination process S3 that there is no pedestrian in the vicinity of the own vehicle 100 (N), and the processing proceeds to a determination process S5. The determination process S5 will be described later using FIG. 4.

In the determination process S4, the danger determination means 3 predicts a danger of collision between the pedestrian P and the vehicle C. As described above, the danger determination means 3 calculates moving directions and moving speeds of the pedestrian P and the vehicle C, which are moving objects in the vicinity of the own vehicle 100, and calculates relative positions, with respect to the own vehicle 100, of the pedestrian P and the vehicle C having predetermined sizes that are obtainable after an arbitrary time elapses.

If the danger determination means 3 determines, based on the calculated respective relative positions of the pedestrian P and the vehicle C, that the pedestrian P and the vehicle C at least partly overlap with each other at the same relative position after an arbitrary time elapses, the danger determination means 3 determines that there is a danger of collision. Alternatively, a collision danger area that has a predetermined size and moves together with the vehicle C may be set on the front side of the vehicle C in the travelling direction, according to the moving speed of the vehicle C. Then, if the danger determination means 3 determines that the collision danger area or the vehicle C and the pedestrian P at least partly overlap with each other at the same relative position after an arbitrary time elapses, the danger determination means 3 determines that there is a danger of collision. Alternatively, a virtual collision danger area that includes the vehicle C and has a boundary outside the vehicle C may be set. Then, if the danger determination means 3 determines that this collision danger area and the pedestrian P at least partly overlap with each other at the same relative position after an arbitrary time elapses, the danger determination means 3 determines that there is a danger of collision.

If the danger determination means 3 determines in the determination process S4 that there is a danger of collision between the pedestrian P and the vehicle C (Y), the processing proceeds to a process S6. In contrast, if the danger determination means 3 determines that there is no danger of collision between the pedestrian P and the vehicle C (N), the processing proceeds to the determination process S5. The determination process S5 will be described later.

In the determination process S6, the danger notification means 4 notifies the pedestrian P and a driver of the vehicle C of a danger of collision. As described above, the danger notification means 4 of the present embodiment is mounted on the own vehicle 100 for a purpose different from a danger notification purpose. The danger notification means 4 notifies the pedestrian P and the driver of the vehicle C of a danger of collision by, for example, flickering the headlight H, the winker W, the brake lamp B, a small light (not illustrated), a fog lamp (not illustrated), or the like, or by honking a horn. In response to the danger notification, the pedestrian P stops walking or stops jumping out to or crossing a road, so that the danger of collision between the pedestrian P and the vehicle C is avoided. In addition, the driver of the vehicle C decelerates the vehicle C, or pays attention to the own vehicle 100, so that the danger of collision between the pedestrian P and the vehicle C is avoided.

Figure 4:
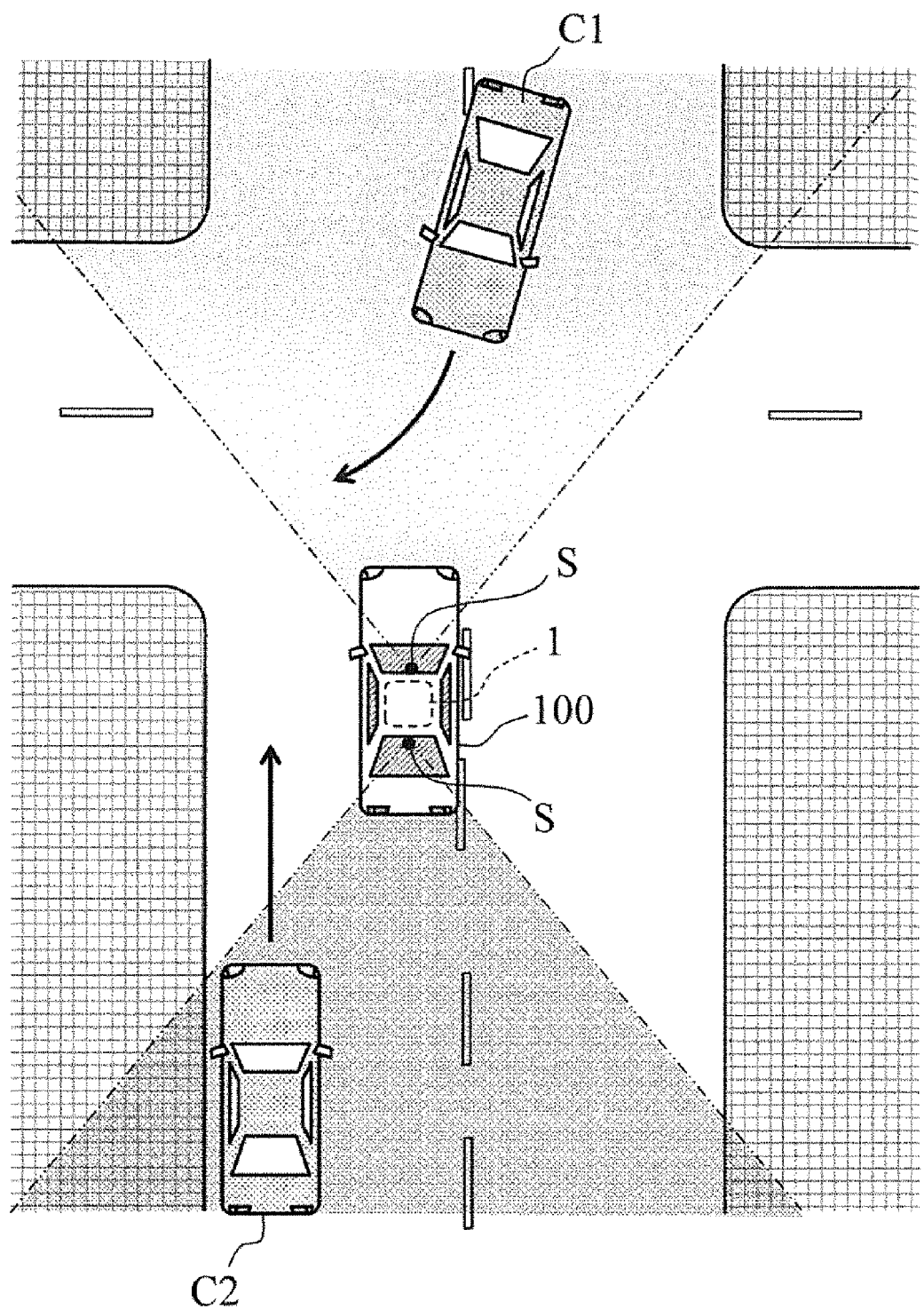
FIG. 4 is a schematic view of a second example illustrating a state in which the vehicle illustrated in FIG. 1 is stopped at an intersection.

FIG. 4 corresponds to another example, i.e., a second example of the first embodiment of the present invention, and illustrates an example in which the own vehicle 100 is stopped in front of an intersection when turning right at the intersection. In this example, a vehicle C1 on an oncoming traffic lane that is in front of the own vehicle 100 is about to turn right at the intersection, and a vehicle C2 that is on the rear side of the own vehicle 100 is about to overtake the own vehicle 100 from the left side and go straight down the intersection. Nevertheless, since the own vehicle 100 generates a blind area, drivers of the vehicles C1 and C2 cannot visually recognize the each other's vehicles C1 and C2.

In such a case, the own vehicle 100 is also in a stopped state. Thus, similarly to the above-described case in which the vehicle is parked, the processing proceeds from the determination process S1 to the determination process S2 that are illustrated in FIG. 3. Then, in the determination process S2, based on images of detected objects detected using two respective stereo cameras S for checking the front side and the rear side that are mounted on the own vehicle 100 as illustrated in FIG. 4, the outside recognition means 2 identifies that the detected objects are the vehicles C1 and C2, and recognizes the moving vehicles C1 and C2 as moving objects. As a result, the danger determination means 3 determines that there is the vehicle C in the vicinity of the own vehicle 100 (Y), and the processing proceeds to the process S3.

In the determination process S3, since there is no pedestrian in the vicinity of the own vehicle 100, and the outside recognition means 2 does not identify a pedestrian from the detected objects, the danger determination means 3 determines in the determination process S3 that there is no pedestrian in the vicinity of the own vehicle 100 (N), and the processing proceeds to the determination process S5.

In the determination process S5, the danger determination means 3 predicts a danger of collision between the vehicles C1 and C2. As described above, the danger determination means 3 calculates moving directions and moving speeds of the vehicles C1 and C2, which are moving objects in the vicinity of the own vehicle 100, and calculates relative positions, with respect to the own vehicle 100, of the vehicles C1 and C2 having predetermined sizes that are obtainable after an arbitrary time elapses.

If the danger determination means 3 determines, based on the calculated respective relative positions of the vehicles C1 and C2, that the vehicles C1 and C2 at least partly overlap with each other at the same relative position after an arbitrary time elapses, the danger determination means 3 determines that there is a danger of collision. Alternatively, collision danger areas as described above may be set for the vehicles C1 and C2. Then, if the danger determination means 3 determines that the collision danger areas of the vehicles C1 and C2 at least partly overlap with each other at the same relative position after an arbitrary time elapses, the danger determination means 3 determines that there is a danger of collision. If the danger determination means 3 determines in the determination process S5 that there is a danger of collision between the vehicles C1 and C2 (Y), the processing proceeds to the process S6.

In the process S6, as described above, the danger notification means 4 notifies drivers of the vehicles C1 and C2 of a danger of collision, using a general-purpose device mounted on the own vehicle 100 for a purpose different from a danger notification purpose. In response to the danger notification, the vehicle C1 stops turning right, or the vehicle C2 decelerates, so that the danger of collision between the vehicles C1 and C2 is avoided.

Figure 5:
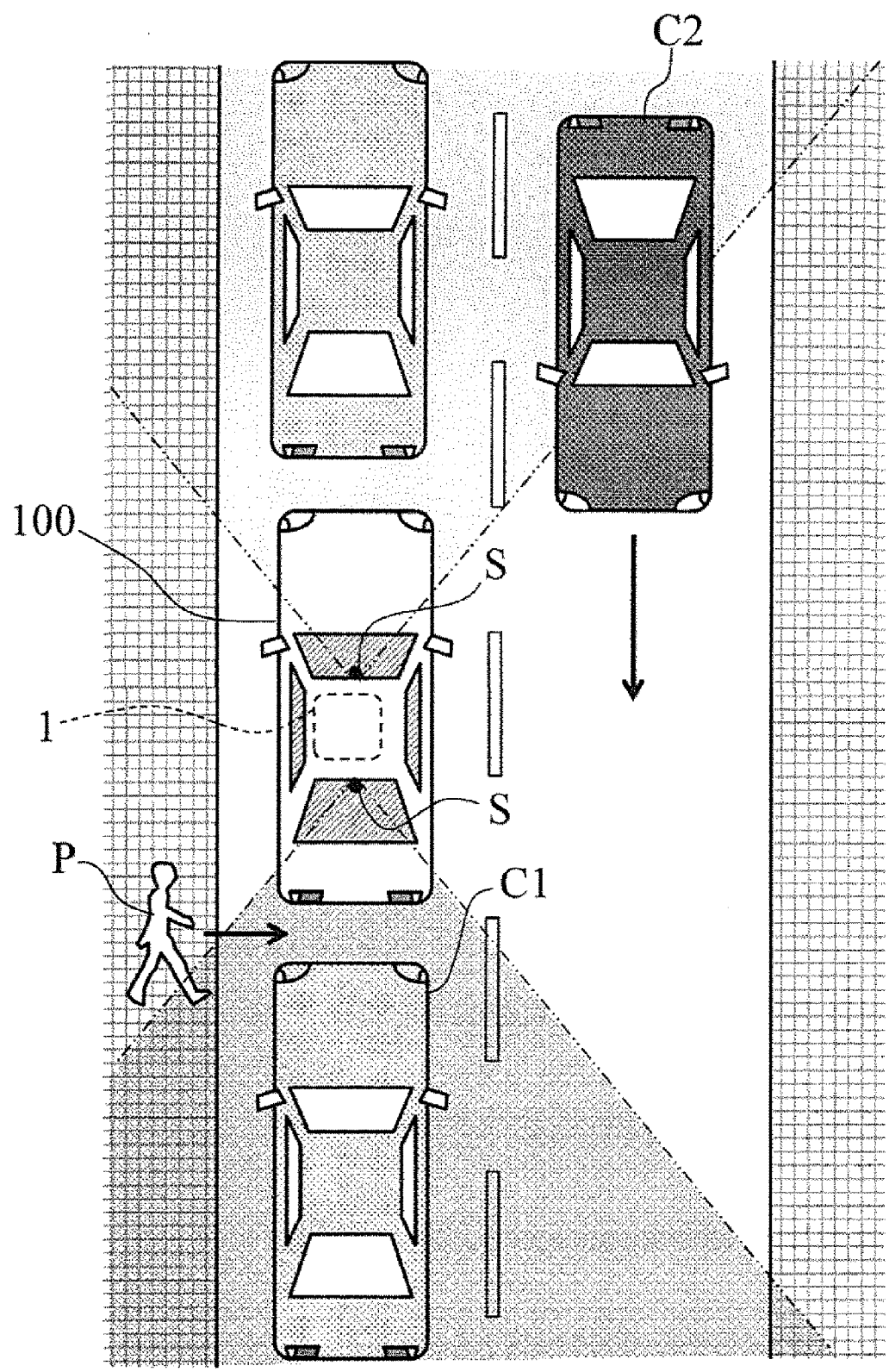
FIG. 5 is a schematic view of a third example illustrating a state in which the vehicle illustrated in FIG. 1 is stopped during a traffic jam.

FIG. 5 corresponds to yet another example, i.e., a third example, and illustrates an example in which the own vehicle 100 is stopped in a line of vehicles on clogged road. In this example, a pedestrian P is about to cross the road by passing through between the own vehicle 100 and a vehicle C1 on the rear side of the own vehicle 100. On an oncoming traffic lane, a vehicle C2 is approaching from the front side of the own vehicle 100. Nevertheless, since the own vehicle 100 generates a blind area, the pedestrian P and the vehicle C2 cannot visually recognize each other.

In such a case, the own vehicle 100 is also in a stopped state. Thus, similarly to the above-described case in which the vehicle is parked, the processing proceeds from the determination process S1 to the determination process S2 that are illustrated in FIG. 3. Then, in the determination process S2, based on images of detected objects detected using two respective stereo cameras S for checking the front side and the rear side that are mounted on the own vehicle 100 as illustrated in FIG. 5, the outside recognition means 2 identifies that the detected objects are the pedestrian P and the vehicle C2, and recognizes the moving pedestrian P and the moving vehicle C2 as moving objects. As a result, the danger determination means 3 determines that there is the vehicle C in the vicinity of the own vehicle 100 (Y), and the processing proceeds to the process S3.

As described above, the danger determination means 3 determines in the determination process S3 that there is the pedestrian P in the vicinity of the own vehicle 100 (Y), and the processing proceeds to the determination process S4.

In the determination process S4, in a similar manner to the above, the danger determination means 3 determines whether there is a danger of collision between the pedestrian P and the vehicle C2. If the danger determination means 3 determines that there is a danger of collision between the pedestrian P and the vehicle C (Y), the processing proceeds to the process S6. In contrast, if the danger determination means 3 determines that there is no danger of collision between the pedestrian P and the vehicle C2 (N), the processing proceeds to the process S5.

Since the outside recognition means 2 does not identify any vehicle other than the vehicle C2 as a moving object, the danger determination means 3 determines in the process S5 that there is no danger of collision between the vehicle C2 and another vehicle (N), and the processing of the danger notification control apparatus 1 ends.

In the process S6, as described above, the danger notification means 4 notifies the pedestrian P and a driver of the vehicle C2 of a danger of collision, using a general-purpose device mounted on the own vehicle 100 for a purpose different from a danger notification purpose. In response to the danger notification, the pedestrian P stops crossing the road, or the vehicle C2 decelerates, so that the danger of collision between the pedestrian P and the vehicle C2 is avoided.

As described above, according to the danger notification control apparatus 1 of the present embodiment, the stopped own vehicle 100, which generates a blind area for the pedestrian P or the driver of the vehicle C, C1, or C2, can determine a danger of collision between the vehicle C or C2 and the pedestrian P, or between the vehicles C1 and C2 that are in the vicinity of the own vehicle 100, and notify the pedestrian P and the driver of the vehicle C, C1, or C2 of the danger of collision. Thus, the danger notification control apparatus 1 of the present embodiment can notify the pedestrian P and/or the driver of the vehicle C, C1, or C2 that are in the vicinity of the stopped own vehicle 100, of a danger of collision, without requiring the pedestrian P to carry a communication terminal.

In addition, when the danger notification means 4 notifies the pedestrian P or the driver of the vehicle C, C1, or C2 that is in the vicinity of the own vehicle 100 of a danger of collision with a vehicle, the danger notification control apparatus 1 of the present embodiment uses a general-purpose device mounted on the own vehicle 100 for a purpose different from a danger notification purpose. Thus, an installation cost can be saved as compared with a case of providing a dedicated device for issuing collision danger notification.

In addition, in the danger notification control apparatus 1 of the present embodiment, the outside recognition means 2 detects moving objects using the stereo cameras S. Thus, environmental information can be acquired more accurately. Examples of the environmental information include the position information and the size of a moving object, i.e., the pedestrian P or the vehicle C, C1, or C2. The danger notification control apparatus 1 of the present embodiment can therefore identify a large-sized vehicle, a medium-size vehicle, a small-sized vehicle, and a light vehicle such as a motorcycle and a bicycle, and notify these vehicles of a danger. Thus, for example, if a bicycle passes through the side of the own vehicle 100, a driver of the bicycle and a pedestrian that are in danger of collision can be notified of the danger of collision. This can prevent accidental contact between a bicycle and a pedestrian, which frequently occurs in recent years.

Furthermore, the danger notification control apparatus 1 of the present embodiment determines a danger of collision between the pedestrian P and the vehicle C or C2 in preference to a danger of collision between the vehicles C or C2 and another vehicle. This further improves the safety of the pedestrian P.

Second Embodiment

Figure 6:
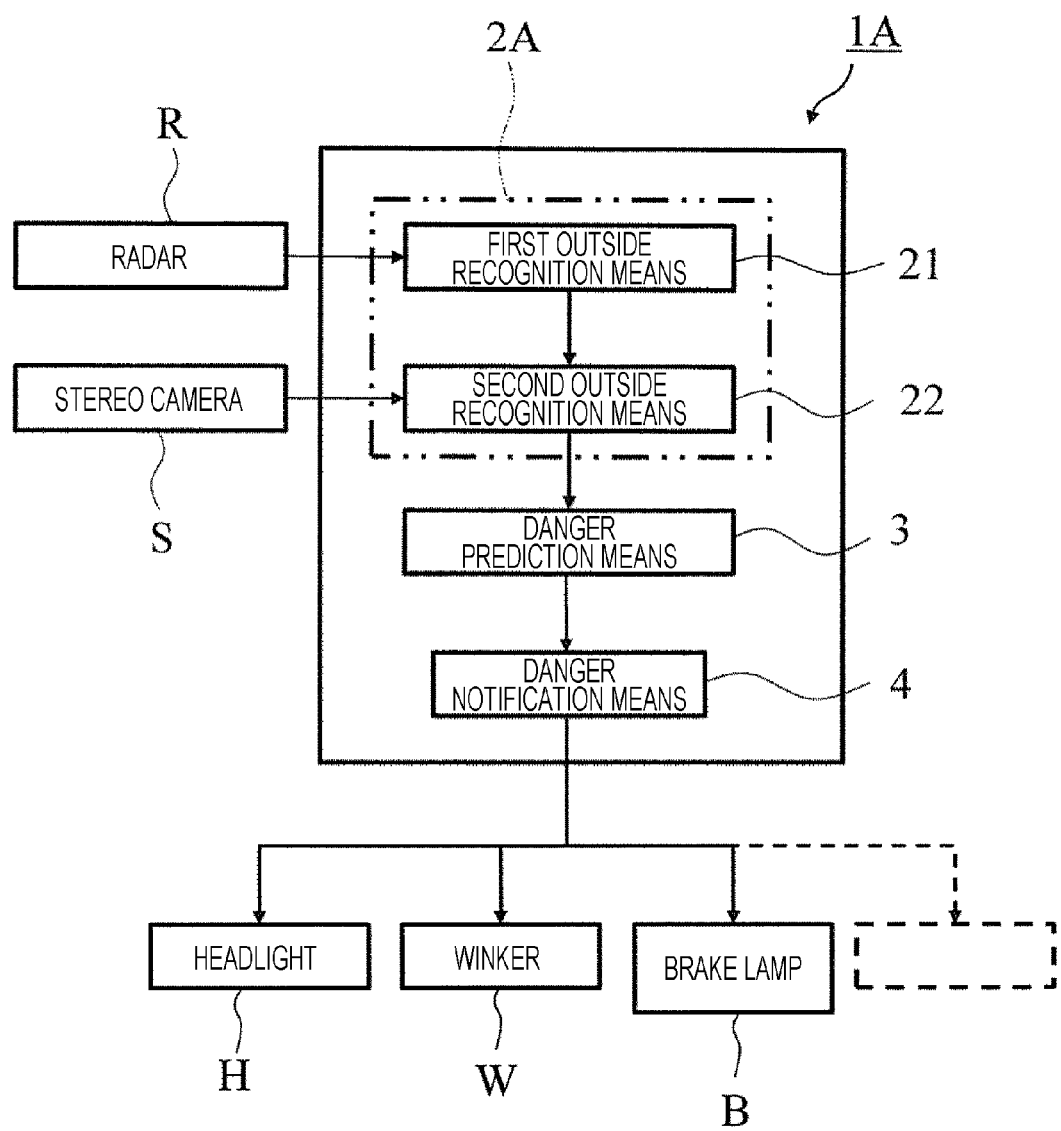
FIG. 6 is a block diagram schematically illustrating a configuration of a danger notification control apparatus according to a second embodiment of the present invention.

Next, a vehicle danger notification control apparatus according to another embodiment of the present invention will be described using FIG. 6, and with reference to FIGS. 1, and 3 to 5. FIG. 6 is a block diagram of the danger notification control apparatus according to the present embodiment. A danger notification control apparatus 1A of the present embodiment differs from the danger notification control apparatus 1 of the first embodiment illustrated in FIG. 2 in that an outside recognition means 2A includes a first outside recognition means 21 and a second outside recognition means 22. The danger notification control apparatus 1A is the same in other points as the danger notification control apparatus 1 of the first embodiment. Thus, the same elements are assigned the same reference numerals, and the descriptions thereof will be omitted.

The first outside recognition means 21 illustrated in FIG. 6 includes a radar R that can detect a vehicle. Similarly to the outside recognition means 2 of the first embodiment, the second outside recognition means 22 detects moving objects using the stereo cameras S. The first outside recognition means 21 consumes less power than the second outside recognition means 22 consumes.

In the present embodiment, in the above-described examples illustrated in FIGS. 1, 4 and 5, if the radar R of the first outside recognition means 21 detects the vehicle C, C1, or C2, the pedestrian P and the vehicle C, C1, or C2 are detected using the second outside recognition means 22. With this configuration, until the radar R of the first outside recognition means 21 detects the vehicle C, C1, or C2, the stereo cameras S of the second outside recognition means 22 can be halted. Thus, according to the present embodiment, power consumption can be reduced as compared with that in the first embodiment. In addition, after the radar R of the first outside recognition means 21 detects the vehicle C, C1, or C2, by starting the stereo cameras S of the second outside recognition means 22, an effect similar to that in the first embodiment can be obtained.

In addition, in the present embodiment, the first outside recognition means 21 detects the vehicle C, C1, or C2 using the radar R. Alternatively, for example, if the vehicle C, C1, or C2 is equipped with a wireless device for transmitting position information of the own vehicle, the first outside recognition means 21 may be equipped with a wireless device for receiving the position information transmitted by the wireless device of the vehicle C, C1, or C2. In this case, power consumption can be further reduced.

The two embodiments of the present invention have been described above. The present invention, however, is not limited to the above-described embodiments, and includes various other modifications. The above-described embodiments have been described in detail for clearly explaining the present invention. Thus, the present invention is not necessarily limited to the one including all the above-described configurations.

For example, in the above-described embodiments, the outside recognition means determines whether a moving object is a vehicle or a pedestrian, and calculates a distance between the own vehicle and the moving object, and a relative position of the moving object with respect to own vehicle. Alternatively, these processes performed by the outside recognition means may be performed by the danger determination means based on an image captured by the stereo camera included in the outside recognition means.

In addition, the outside recognition means may be configured to capture 360-degree images around the own vehicle by the stereo camera. In addition, the outside recognition means may use, instead of the stereo camera or together with the stereo camera, for example, a monocular camera, a laser radar, a millimeter wave radar, and the like. The outside recognition means may use, for example, a stereo camera for detecting a moving object on the front side of the own vehicle, and a monocular camera, a laser radar, a millimeter wave radar, or the like for detecting a moving object on the rear side of the own vehicle. When a radar is used as the outside recognition means, a vehicle and a pedestrian can be distinguished from each other based on the intensity of reflected waves of the radar.

REFERENCE SIGNS LIST 1, 1A danger notification control apparatus
2, 2A outside recognition means
21 first outside recognition means
22 second outside recognition means
3 danger determination means
4 danger notification means
100 own vehicle
C, C1, C2 vehicle (moving object)
P pedestrian (moving object)

The invention claimed is:
1. A vehicle danger notification control apparatus for notifying a driver of a running vehicle and/or a pedestrian that are/is in a vicinity of an own vehicle, of danger(s) of collision(s) between the running vehicle and the pedestrian and/or between the running vehicle and a second running vehicle, the vehicle danger notification control apparatus comprising:
  at least one camera configured to recognize the running vehicle, the second running vehicle, and/or the pedestrian as a moving object(s);
  at least one processor for executing stored instructions to:
    determine whether the own vehicle is in a stopped state based on data obtained from measurement sensors for measuring speed of the own vehicle;
    determine whether the running vehicle is within the vicinity of the own vehicle;
    determine whether the pedestrian is within the vicinity of the own vehicle;
    determine, when the pedestrian is not within the vicinity of the own vehicle, whether the second running vehicle is within the vicinity of the own vehicle;
    determine whether there is the danger(s) of collision(s) between the running vehicle and the pedestrian and/or between the running vehicle and the second running vehicle, wherein the determination is based on calculating moving directions and moving speeds of the pedestrian, the running vehicle, and/or the second running vehicle and further calculating whether positions of the pedestrian and the running vehicle and/or the positions of the running vehicle and the second running vehicle will at least partly overlap at a same relative position after a predetermined period of time; and
    notify, based on the determination that there is the danger(s) of collision(s), the driver of the running vehicle, a driver of the second running vehicle, and/or the pedestrian of the danger(s) of collision(s) using one or more components of the own vehicle.

2. The vehicle danger notification control apparatus according to claim 1,
wherein the at least one camera sequentially captures relative positions of the moving objects with respect to the own vehicle.

3. The vehicle danger notification control apparatus according to claim 2,
wherein the at least one camera includes a first camera for recognizing the running vehicle, and a second camera for recognizing other moving objects, and
in a case in which the first camera recognizes the running vehicle, the second camera recognizes the other moving objects.

4. The vehicle danger notification control apparatus according to claim 1, wherein the at least one camera is a stereo camera mounted on the own vehicle.

5. The vehicle danger notification control apparatus according to claim 1, wherein the one or more components of the own vehicle used for the notification of the danger(s) of collision(s) includes one or more of: (i) a headlight, (ii) a blinker, (iii) a brake lamp, (iv) a fog lamp, (v) a backup light, (vi) a horn, (vii) an antitheft alarm, and (viii) a speaker.

6. The vehicle danger notification control apparatus according to claim 1, wherein if the positions of the pedestrian and the running vehicle at least partly overlap at the same relative position after the predetermined period of time based on the calculated moving direction and the moving speeds of the pedestrian and the running vehicle, the determination is that there is the danger of collision.

7. The vehicle danger notification control apparatus according to claim 1, wherein the running vehicle has a collision danger area that has a predetermined size and moves together with the running vehicle and the collision danger area is settable on a front side of the running vehicle in a traveling direction according to the moving speed of the running vehicle, and if a position of the collision danger area and the position of the pedestrian at least partly overlap with each other at the same relative position after the predetermined period of time, the determination is that there is the danger of collision.

8. The vehicle danger notification control apparatus according to claim 1, wherein the running vehicle has a virtual collision danger area that includes the running vehicle and has a boundary settable outside the running vehicle, and if a position of the virtual collision danger area and the position of the pedestrian at least partly overlap with each other at the same relative position after the predetermined period of time, the determination is that there is the danger of collision.

9. The vehicle danger notification control apparatus according to claim 1, wherein the at least one processor is configured to determine the danger of collision between the running vehicle and the pedestrian in preference to the danger of collision between the running vehicle and the second running vehicle.

10. The vehicle danger notification control apparatus according to claim 1, further comprising a radar and if the radar is configured to detect the running vehicle and the second running vehicle, the at least one camera is configured to detect the pedestrian, the running vehicle, and the second running vehicle, wherein the radar consumes less power than the at least one camera, and wherein use of the at least one camera is halted until the radar detects the running vehicle and the second running vehicle.

11. The vehicle danger notification control apparatus according to claim 1, further comprising a wireless device for receiving position information of the own vehicle transmitted by respective wireless devices of the running vehicle and the second running vehicle.

\* \* \* \* \*